US006968605B2

(12) United States Patent
Zamora

(10) Patent No.: US 6,968,605 B2
(45) Date of Patent: Nov. 29, 2005

(54) TAGGING APPARATUS AND METHOD

(76) Inventor: G. Rene Zamora, 3737 Executive Center Dr., No. 111, Austin, TX (US) 78731

(*) Notice: Subject to any disclaimer, the term of this patent is extended or adjusted under 35 U.S.C. 154(b) by 0 days.

(21) Appl. No.: 10/799,150

(22) Filed: Mar. 12, 2004

(65) Prior Publication Data
US 2004/0178246 A1 Sep. 16, 2004

Related U.S. Application Data

(60) Provisional application No. 60/454,420, filed on Mar. 13, 2003.

(51) Int. Cl.[7] .......................... B23P 11/00; B23P 19/00
(52) U.S. Cl. ...................... 29/432; 29/464; 29/525.01; 29/716; 29/798; 29/811.2; 29/275; 227/18; 227/120
(58) Field of Search ................... 29/432, 464, 466, 29/525.01, 709, 716, 798, 809, 811.2, 270, 29/275, 758; 227/8, 18, 119, 120

(56) References Cited

U.S. PATENT DOCUMENTS

| | | | | |
|---|---|---|---|---|
| 3,385,498 A | * | 5/1968 | Downie | 227/18 |
| 3,918,143 A | * | 11/1975 | Grushon | 29/429 |
| 4,182,474 A | * | 1/1980 | Sato | 227/99 |
| 4,323,183 A | * | 4/1982 | Duchin | 227/3 |
| 4,610,384 A | * | 9/1986 | Duchin | 227/67 |
| 4,610,385 A | * | 9/1986 | Duchin | 227/67 |
| 4,634,036 A | * | 1/1987 | Duchin | 227/67 |
| 4,711,369 A | * | 12/1987 | Duchin | 221/213 |
| 4,785,987 A | * | 11/1988 | Strausburg | 227/67 |
| 5,184,752 A | * | 2/1993 | Zylka et al. | 221/1 |
| 5,484,094 A | * | 1/1996 | Gupta | 227/8 |
| 5,501,002 A | * | 3/1996 | Fukami | 29/811.2 |
| 5,634,583 A | * | 6/1997 | McGuinness et al. | 227/120 |
| 5,791,546 A | * | 8/1998 | McGuinness et al. | 227/120 |
| 6,273,315 B1 | * | 8/2001 | McGuinness et al. | 227/18 |
| 6,508,392 B1 | * | 1/2003 | Huang | 227/18 |
| 2004/0089708 A1 | * | 5/2004 | Leger et al. | 235/375 |
| 2004/0173658 A1 | * | 9/2004 | Castellanos | 227/113 |

* cited by examiner

Primary Examiner—Essama Omgba
(74) Attorney, Agent, or Firm—J. Nevin Shaffer, Jr.

(57) ABSTRACT

A tag apparatus and method includes a nail gun with a tag positioning device. The tag positioning device is connected to a nail gun safety probe. Flexible tags are held in a tag magazine. Upon depression of the safety probe, a tag is rotated from its storage position within the tag magazine into position in front of the nail gun. According to one embodiment a scanning device is connected to the tag apparatus for obtaining data from tags after they are attached to an object.

20 Claims, 16 Drawing Sheets

TAGGING APPARATUS AND METHOD

CROSS REFERENCE TO RELATED APPLICATION

The applicant hereby claims the benefit of the earlier filing date of Mar. 13, 2003, of Provisional Application Ser. No. 60/454,420 under 35 U.S.C. § 119 (e).

TECHNICAL FIELD

This invention relates to a tagging apparatus and method. In particular, with regard to applying tags to trees, this invention relates to a tagging apparatus and method for affixing a tag to a tree.

BACKGROUND OF THE INVENTION

Many tasks undertaken by humans involve repetitive motion. The industrial revolution is a byproduct of organizing and simplifying a process by breaking it down to a series of repetitive actions. In every situation where an individual is faced with repeating a task, inevitably the question arises: Can the job be done more efficiently?

For the purposes of example only, and not by way of any limitation, tagging trees is one activity of land surveying in which several hundred trees and sometimes thousands must be tagged as fast as possible. Typically, the best efforts result in tags being applied at a rate of approximately three hundred per day during the course of a surveying project. The conventional technique for tagging trees is to use a hammer, a sack of nails, and a set of tags. The chief complaint of the manual technique is that it is slow and cumbersome, particularly in less than perfect field environments. This prior art process is cumbersome in that it requires manual handling of a tag, then the nail, then aligning the nail and tag on the tree and then hammering the nail multiple times until the tag is fixed to the tree. Thus there is a need in the art for an apparatus and method for applying tags that is easy to handle, quick, accurate, automatic and inexpensive.

SUMMARY OF THE INVENTION

The tagging apparatus and method of the present invention includes an automated nail gun. The automated nail gun includes an attached tag magazine. A tag positioning device is connected to the nail gun and a nail gun safety probe. The connection converts the translational movement of the safety probe as it is pressed against a tree, for example only, into rotational movement of the tag positioning device such that a tag is rotated from the tag magazine into position between the nail gun and a tree. Operation of the nail gun results in a nail passing through the tag and into the tree. Removal of the nail gun from the area of the tree completes the removal of the tag from the tag magazine. Additionally, removal of the nail gun from the tree releases the safety probe to return to its extended position and rearms the tag positioning device such that the tagging apparatus is ready for reuse and application of another tag to another tree.

According to another embodiment of the invention, a scanner device is connected to the nail gun. Scanable data is added to the tags. A data reader is connected to the safety probe and connected to the scanner device. In operation, after the tag is attached to a tree, for example only, as described above, the data reader is passed over the scanable data on the tag and transmitted to the scanner device. The scanner device is removably attached to the nail gun such that, as needed, the scanner device can be removed and the collected data transferred to a data storage and manipulation device, such as a computer.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
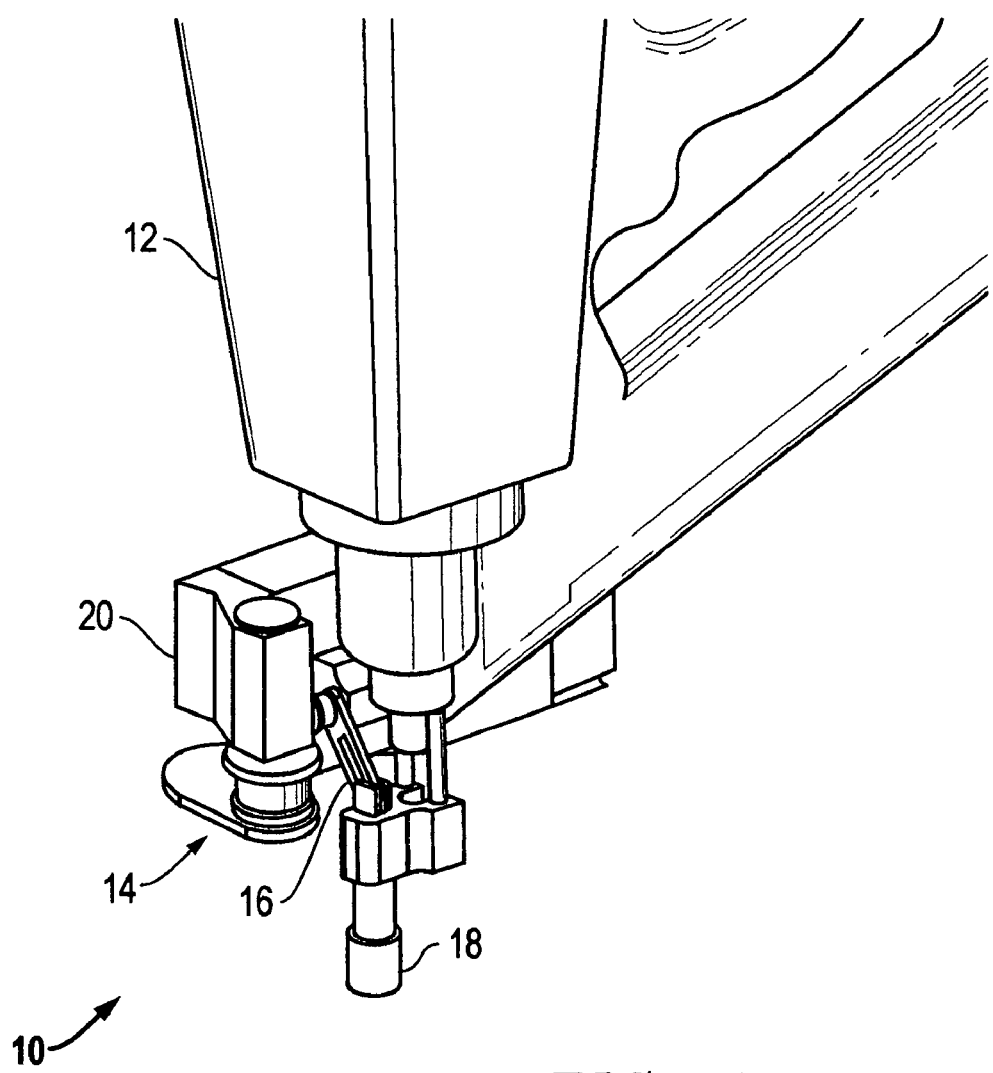
FIG. 1 is a partial perspective view of the tag apparatus according to an embodiment of the invention.
Figure 2:
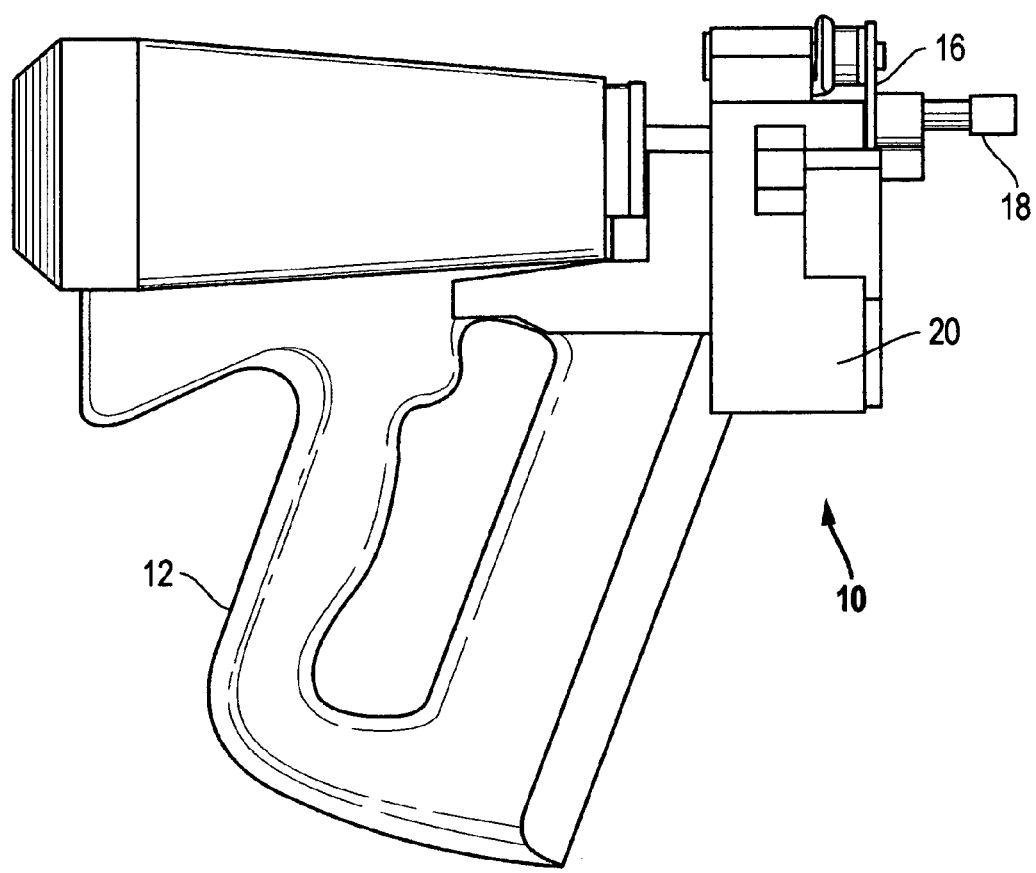
FIG. 2 is a right side perspective view of the tag apparatus shown in FIG. 1.
Figure 3:
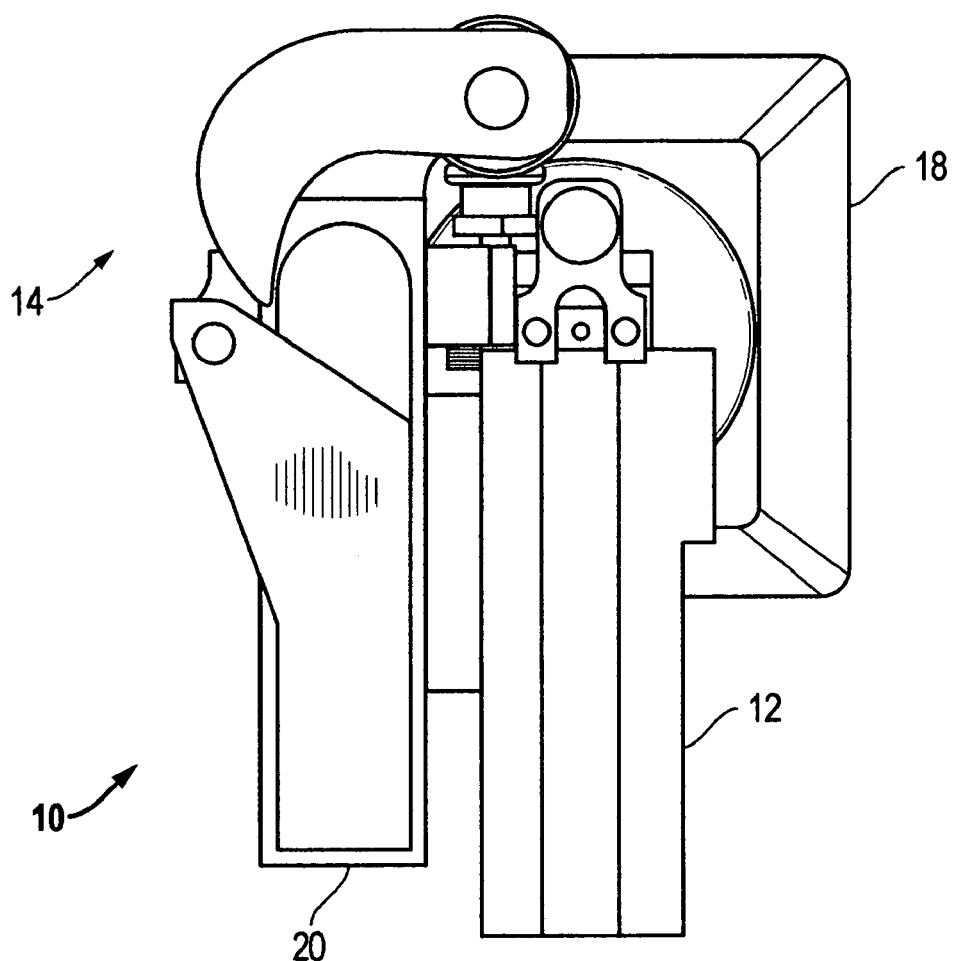
FIG. 3 is a bottom view of the apparatus of FIG. 1.
Figure 4:
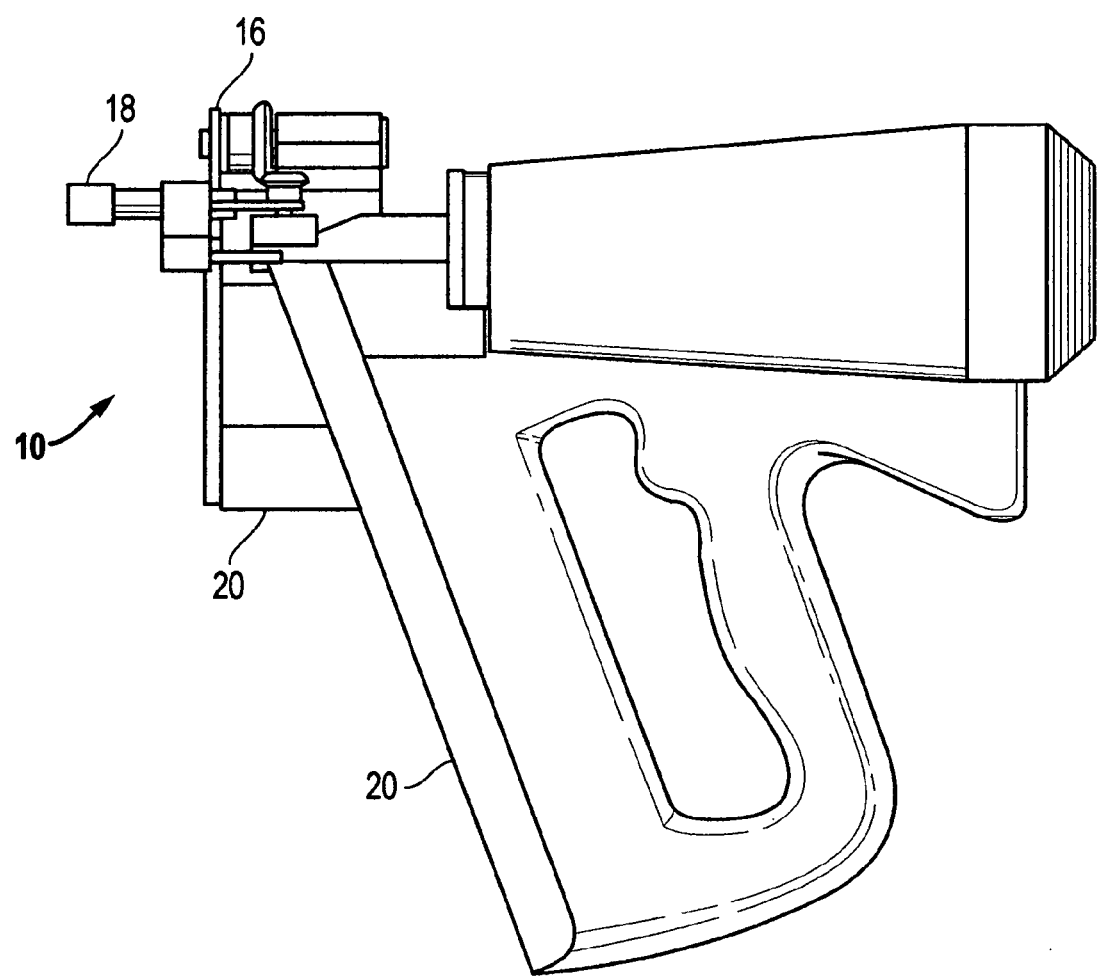
FIG. 4 is a left side perspective view of the apparatus of FIG. 1.

An embodiment of the present invention is illustrated by reference to FIGS. 1–21 wherein the same number is used to identify the same element of the invention in each figure in which the element appears. Referring to FIGS. 1–4, tag apparatus 10 includes nail gun 12. Tag positioning device 14 is attached to nail gun 12. Tag positioning device 14 is attached to safety probe 18 by means of connection 16. Tag magazine 20 is connected to tag positioning device 14. For the purposes of this invention, nail gun 12 may be any nail gun now known or hereafter developed. By way of example only, and not by limitation, nail gun 12, may be a nail gun such is that marketed by Illinois Tool Works Company under the brand Paslode. This nail gun is a sixteen gauge angled nail finisher weighing only 4.9 pounds.

Figure 5:
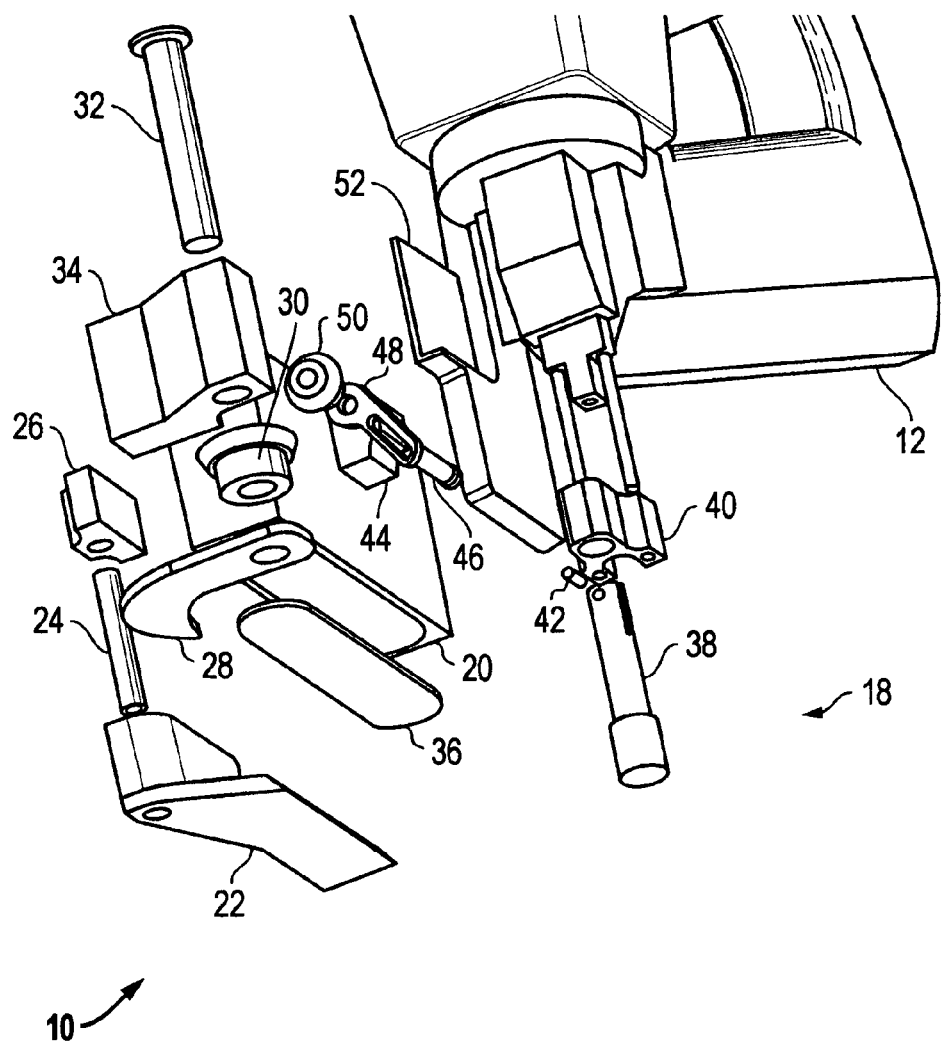
FIG. 5 is a bottom partial exploded view of the apparatus of FIG. 1.

Referring now to FIG. 5, particulars of tag apparatus 10 are illustrated in this exploded view. Tag positioning device 14 includes keeper 22, keeper shaft 24 and keeper bearing 26. Additionally, tag positioning device 14 includes lower arm 28, large gear 30, large shaft 32, and front bearing 34.

Also shown are tag magazine 20 with tags 36. Tag 36 may be any type of tag now known or hereafter developed. According to one embodiment, tag 36 is a thin, in the range of approximately two hundredths of an inch thick, flexible, polymer tag. Tag 36 may be any dimension useful for a particular purpose. According to one embodiment of the invention, however, it is useful that tag 36 is flexible as this allows the tag to be partially held within magazine 20 while a nail is driven through the tag. Thereafter, as the nail gun 12 is removed from the area of attachment, the tag 36 can bend as it is completely removed from tag magazine 20.

FIG. 5 also illustrates safety probe 18 including piston 38, probe extension 40 and probe attachment pin 42. Further, connection 16 includes small bearing 44, small shaft 46, small arm 48, and small gear 50. In combination, depressing safety probe 18 causes small gear 50 to rotate causing large gear 30 to rotate causing lower arm 28 to rotate and push a portion of tag 36 into position underneath safety probe 18 as will be disclosed and discussed more fully hereafter.

FIG. 5 also shows attachment plate 52 to which tag magazine 20 is connected. Attachment plate 52 is attached to nail gun 12 as illustrated. It should be noted, that tag magazine 20 includes a spring and a tag follower (not illustrated).

Figure 6:
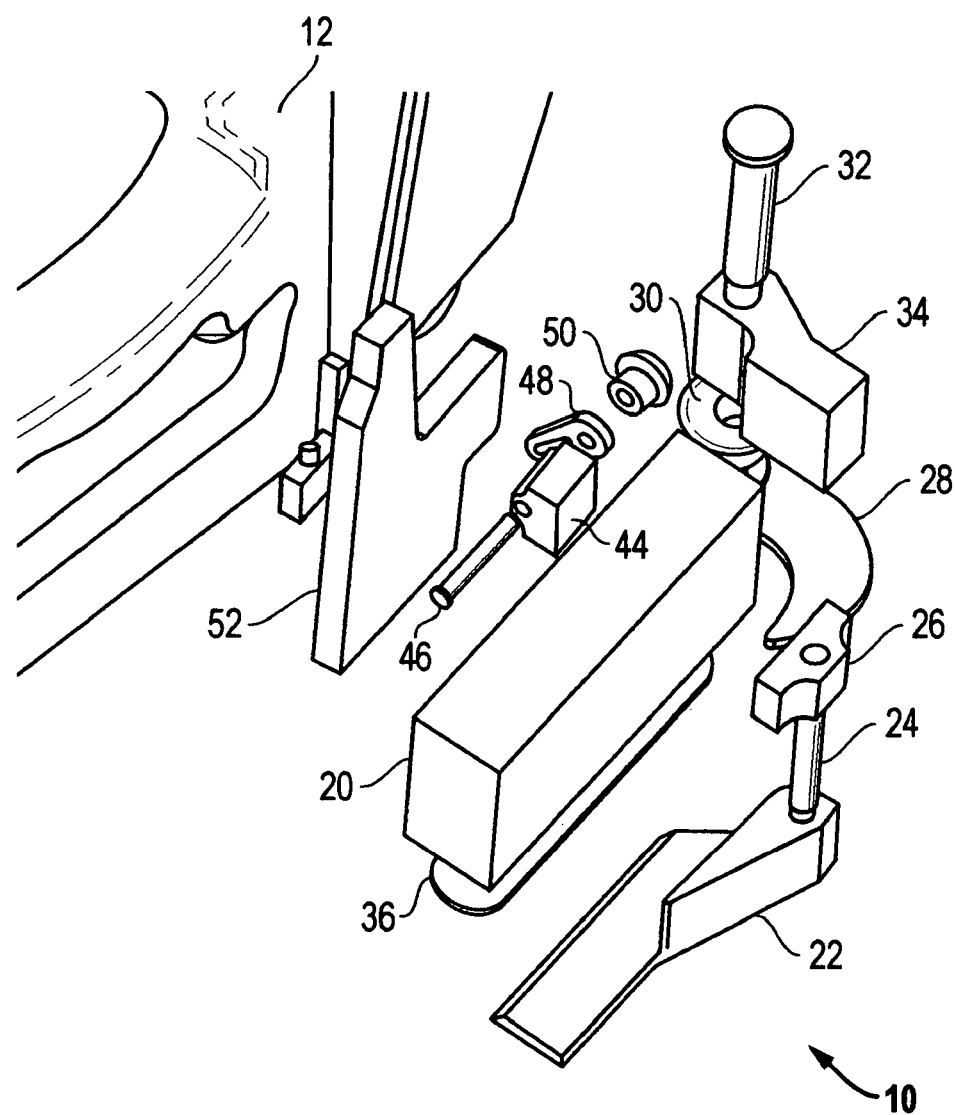
FIG. 6 is a top partial exploded view of the apparatus of FIG. 1.

FIG. 6 is a top exploded view showing the parts just described with reference to FIG. 5.

Figure 7:
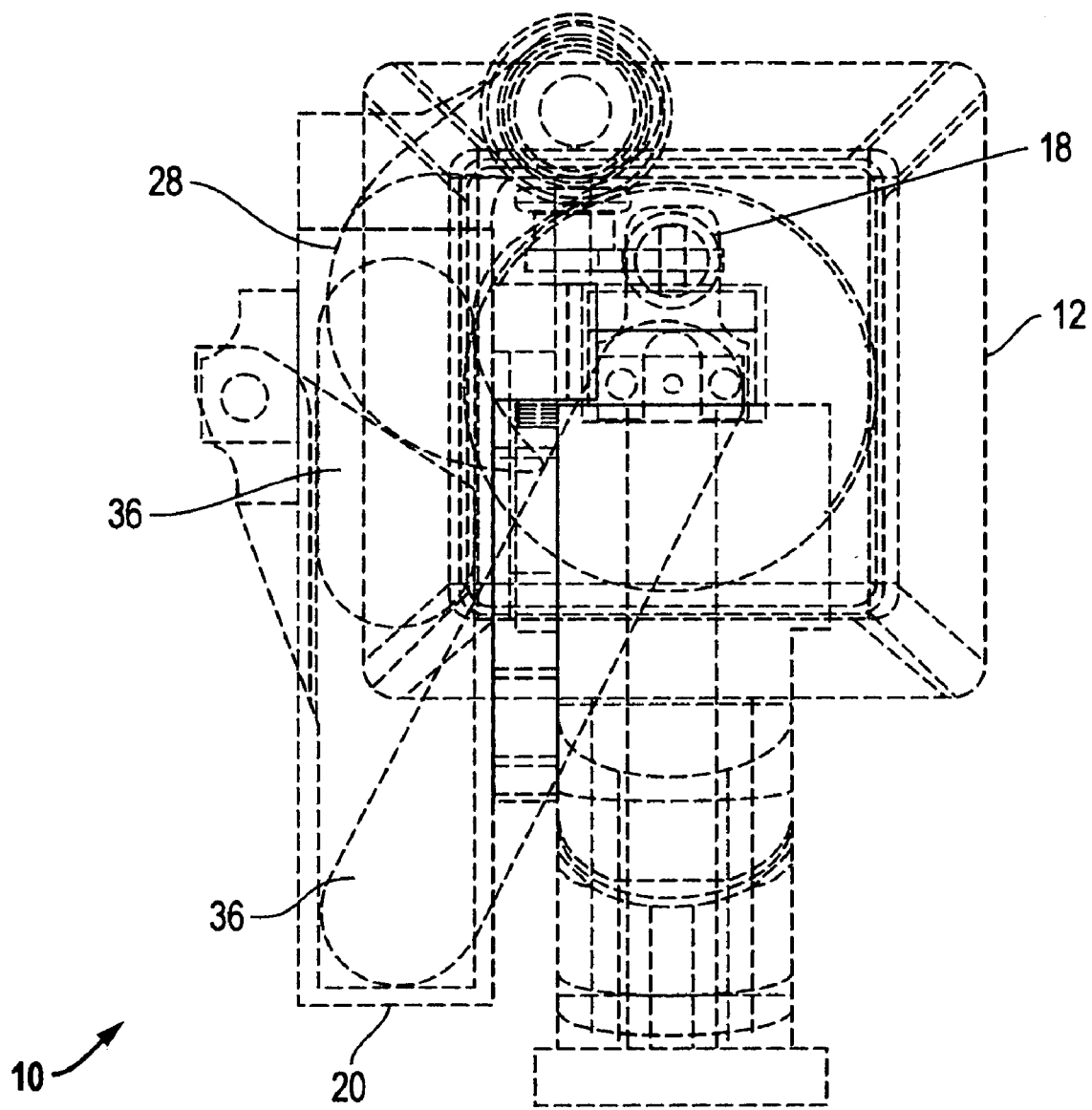
FIG. 7 is a bottom schematic view illustrating the tag rotation function of the tag positioning device of the apparatus of FIG. 1.
Figure 8:
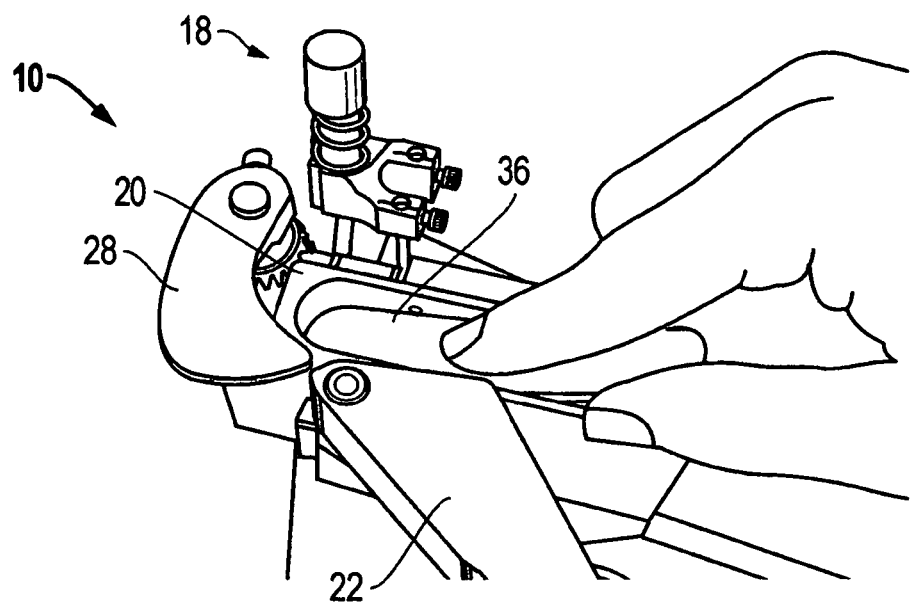
FIG. 8 is a bottom view of the apparatus of FIG. 1 showing tags being loaded into the tag magazine.
Figure 9:
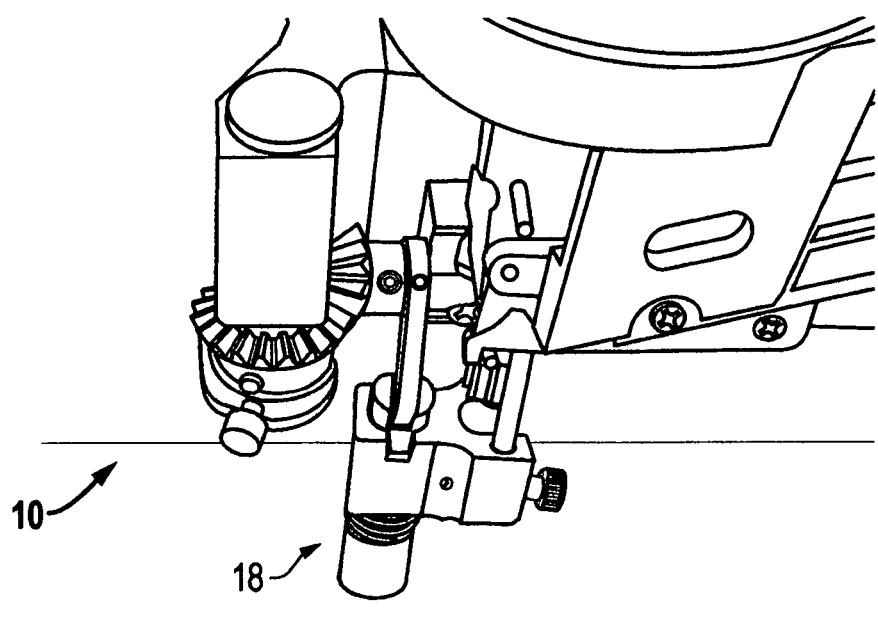
FIG. 9 shows the apparatus of FIG. 1 in the initial position just as contact is made with an object, such as a tree.

FIG. 7 is a bottom schematic view illustrating the function of the lower arm 28 as it is rotationally moved by the depression of safety probe 18 so as to rotate tag 36 from its location in magazine 20 into position to receive a nail from nail gun 12. FIG. 8 illustrates a user loading additional tags 36 into magazine 20. As illustrated, keeper 22 is moved out of the way while tags 36 are loaded. Again, as is known in the art, magazine 20 includes a magazine spring and a magazine follower, not shown. In combination, the spring urges the follower away from the spring thereby putting loading pressure on tags 36 stored in tag magazine 20.

Figure 10:
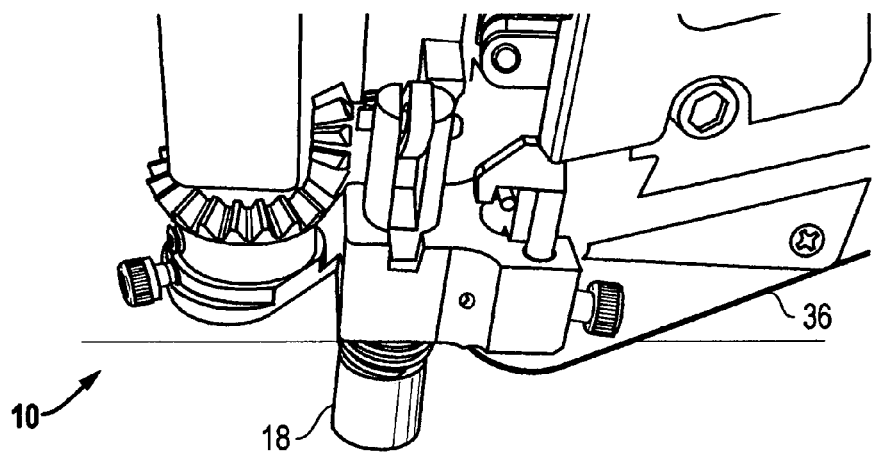
FIG. 10 shows the apparatus of FIG. 1 in the final position with the safety probe fully compressed and the tag in position for attachment.
Figure 11:
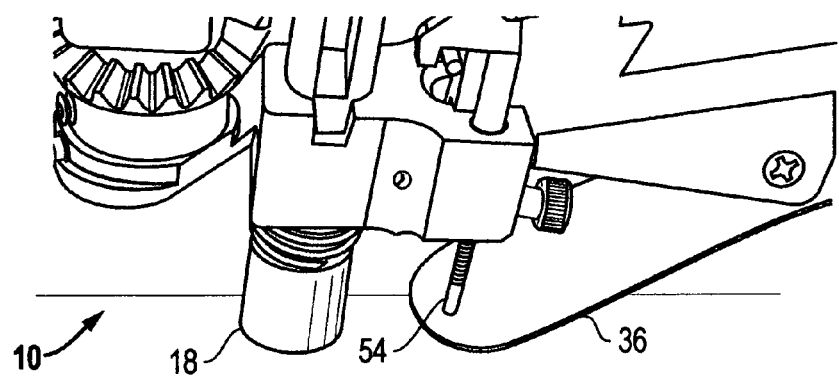
FIG. 11 shows the apparatus in the final position with a nail piercing the tag and attachment to an object.
Figure 12:
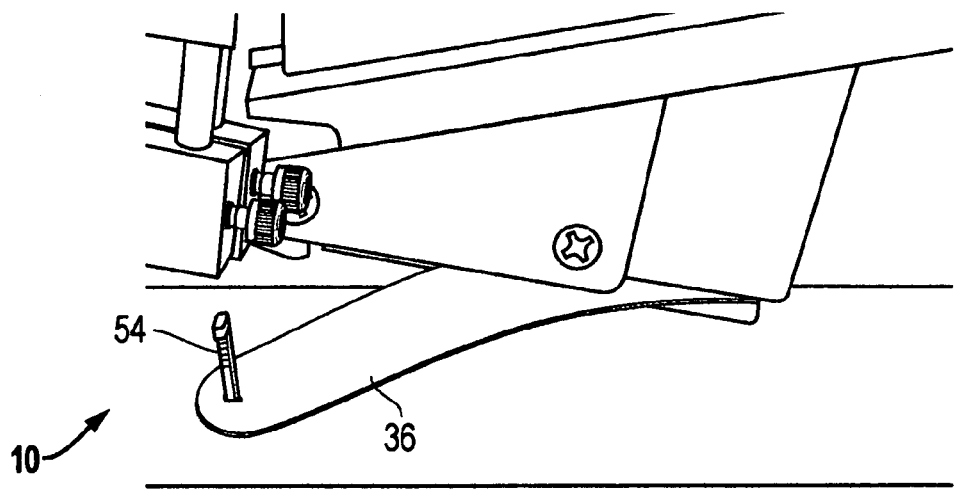
FIG. 12 shows the apparatus removed from the area of the object, the nail attached to the object and piercing the tag with the tag still partially held in the tag magazine.

Referring now to FIGS. 9 through 12, FIG. 9 illustrates the tag apparatus 10 in the initial position, just as contact is made with a tree, for example only and not by way of limitation. FIG. 10 shows the tag apparatus 10 in the final position wherein the safety probe 18 is fully compressed, and the tag 36 fully rotated and in the "firing" position. FIG. 11 shows the tag apparatus 10 in the final position with a nail 54 piercing tag 36. Finally, FIG. 12 illustrates tag apparatus 10 where nail gun 12 is removed from the tree location. It should be noted, as illustrated, that the compliance, flexibility, of tag 36 enables it to flex and easily exit tag magazine 20. That is to say, removing nail gun 12 occurs easily and with little effort due to the flexibility, according to a preferred embodiment, of tags 36. This easy removal is also aided by a large relief angle on the inside edge of the magazine keeper 22 as shown in the illustrations. Again, tag 36 flexes and slips out of the tag magazine 20 as the user pulls the nail gun 12 away from the tree.

Figure 13:
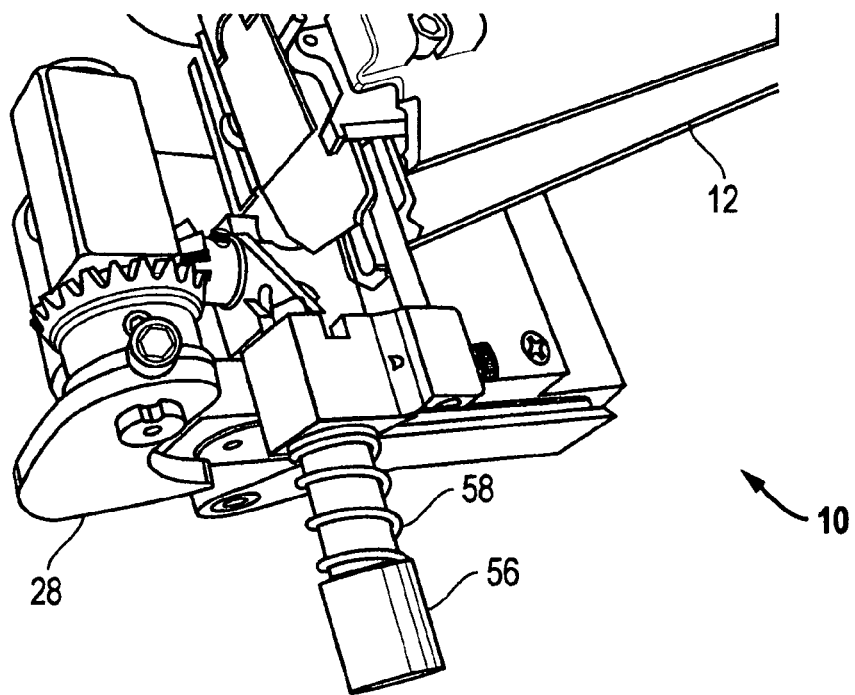
FIG. 13 is a bottom perspective view of the apparatus in position close to an object prior to the depression of the safety probe.
Figure 14:
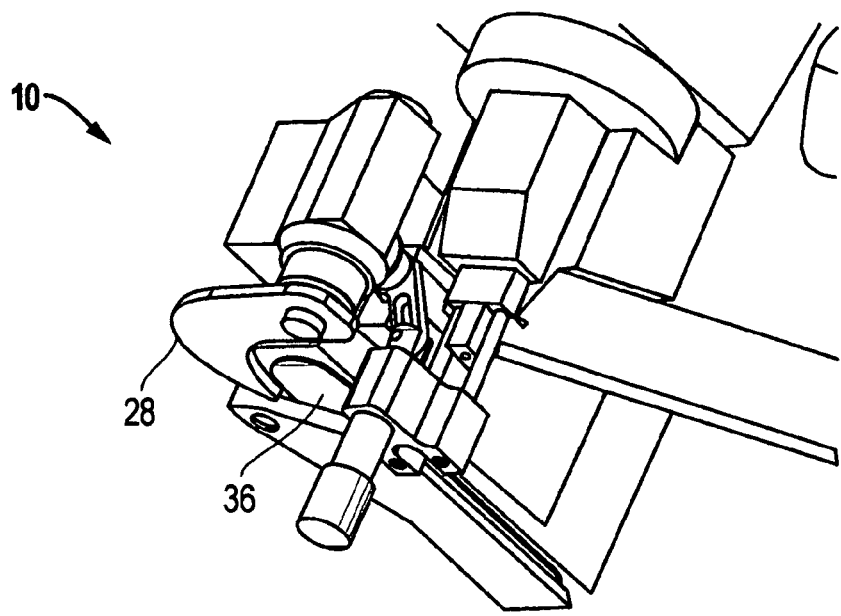
FIG. 14 is another bottom perspective view showing how tags are stored in a ready position.

By way of further explanation, FIG. 13 illustrates tag apparatus 10 in the position near a tree where the tag apparatus begins to convert the translational motion of safety probe 18 as it is pressed against the tree into the rotational movement of lower arm 28. FIG. 13 illustrates tag apparatus 10 with a piston 56 and spring 58, added to the safety probe 18 to gain additional translational travel of the tag 36. FIG. 14 illustrates how tags 36 are stored in tag magazine 20 in a "ready" position. It should be noted that the tag 36 ready to be rotated is held in the tag magazine 20 fairly precisely by the magazine keeper 22. If tag 36 is too deep in tag magazine 20, it will not slide out. If tag 36 is too high, lower arm 28 will grab two tags 36 and malfunction. Obviously, a height adjustment device can be added in order to accommodate wear. Alternatively, tag apparatus 10 can be designed for very long wear life simply by using hardened surface treatments on high wear areas.

Figure 15:
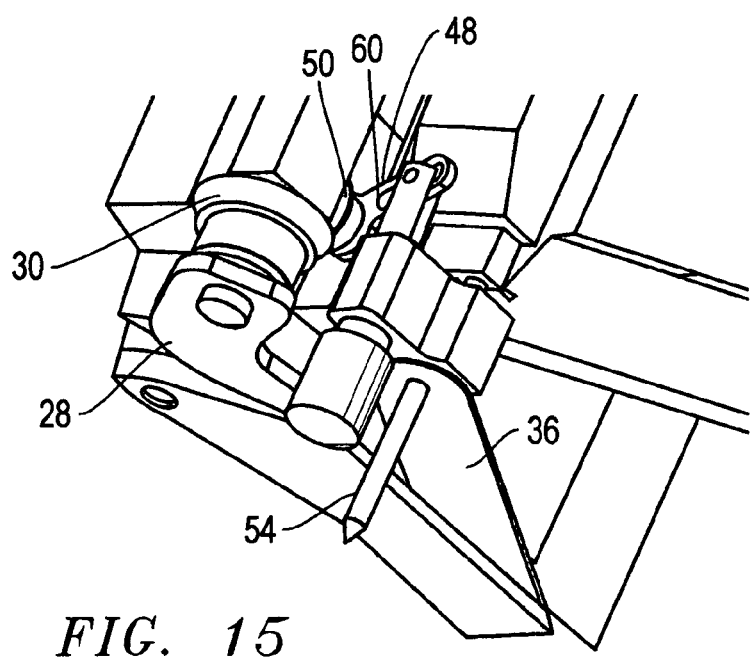
FIG. 15 is a bottom perspective view illustrating the conversion of the motion of depressing the safety probe into the rotational motion of the tag positioning device for rotating the tag into position to receive a nail.
Figure 16:
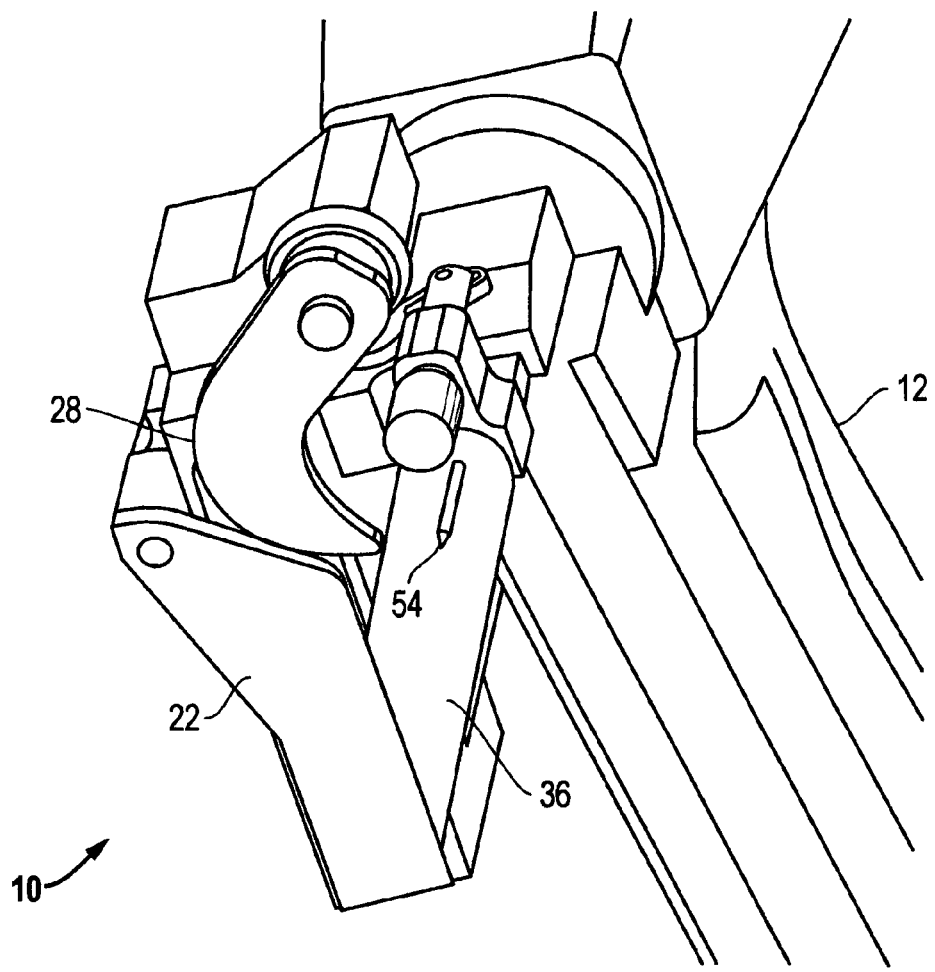
FIG. 16 is a bottom perspective view of the apparatus in the final position with the nail piercing the tag and the tag partially held within the tag magazine.
Figure 17:
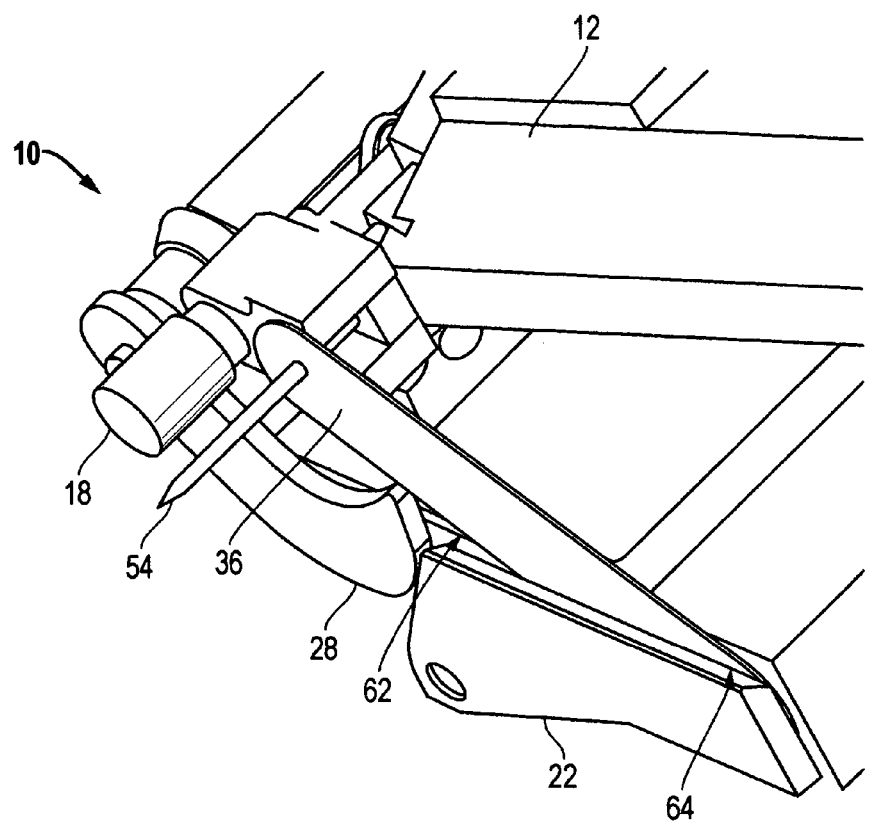
FIG. 17 is another bottom perspective view of the tag as it is held in place by the magazine toward the rear of the apparatus as the nail pierces the tag and fixes the tag to the object.
Figure 18:
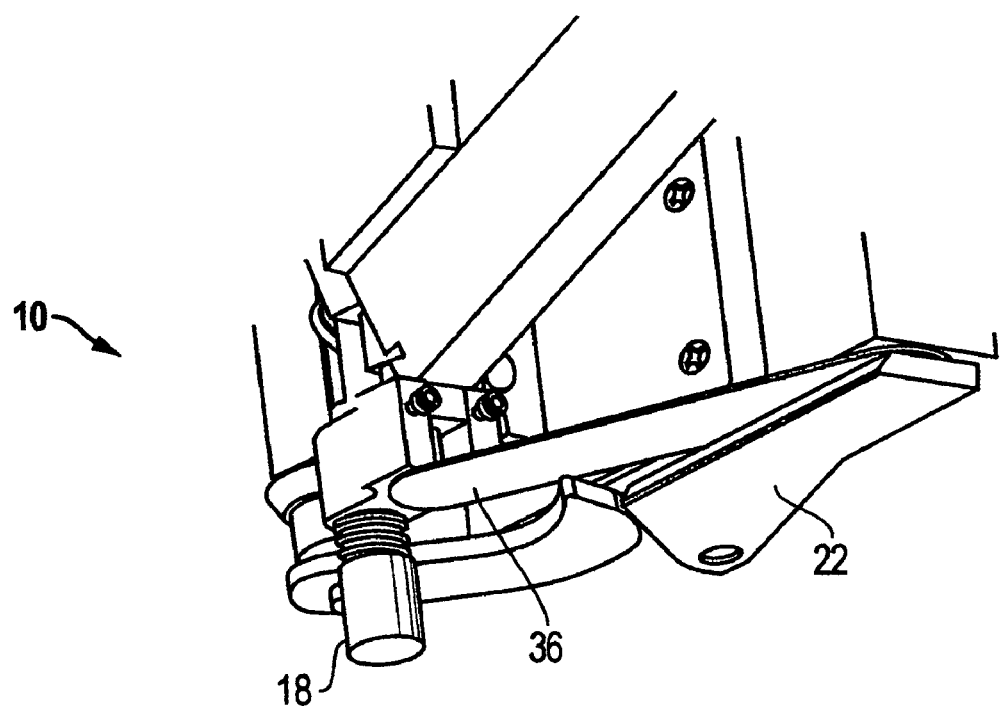
FIG. 18 is a rear bottom perspective view of the apparatus in the final position with the tag in place just before the nail pierces it.

FIGS. 15 through 18 illustrate tag apparatus 10 after a nail 54 has been driven through tag 36. FIG. 15 shows the effect of the translational motion of tag apparatus 10 which causes small arm 48 with a small slot 60 to rotate that in turn rotates small gear 50 which drives large gear 30 and large shaft 32. Ultimately, this moves lower arm 28 which contacts tag 36 in tag magazine 20 and moves tag 36 into position to receive, be pierced by, a nail 54 from nail gun 12. FIGS. 16 and 17 provide additional vantage points of the same stage of operation of the invention as set forth in FIG. 15. FIG. 17 illustrates that the keeper 22 in combination with tag magazine 20 provides a larger opening tolerance 62 at the end of keeper 22 closer to safety probe 18 and a smaller tolerance opening 64 at the rear of keeper 22. As a result, tag 36 is held in place by the combination of keeper 22 and tag magazine 20 toward the rear of keeper 22, as illustrated, after tag 36 is rotated into position. FIG. 18 is, again, another view of tag 36 in the final position being held by tag magazine 20 in combination with keeper 22 as discussed above just before nail 54 pierces the tag 36. The tag apparatus 10 automatically indexes as a user presses gun 12 against a tree, for example. Additionally, tag apparatus 10 automatically resets itself as the user pulls the device away from a tree. This is accomplished by energy stored in the spring 58 as well as the energy stored in the nail gun safety probe 18 mechanism. The reset action repositions all components to their original position and orientation with no action required on the part of the user except the gross motion of the nail gun 12 being pulled away from the tree.

Figure 19:
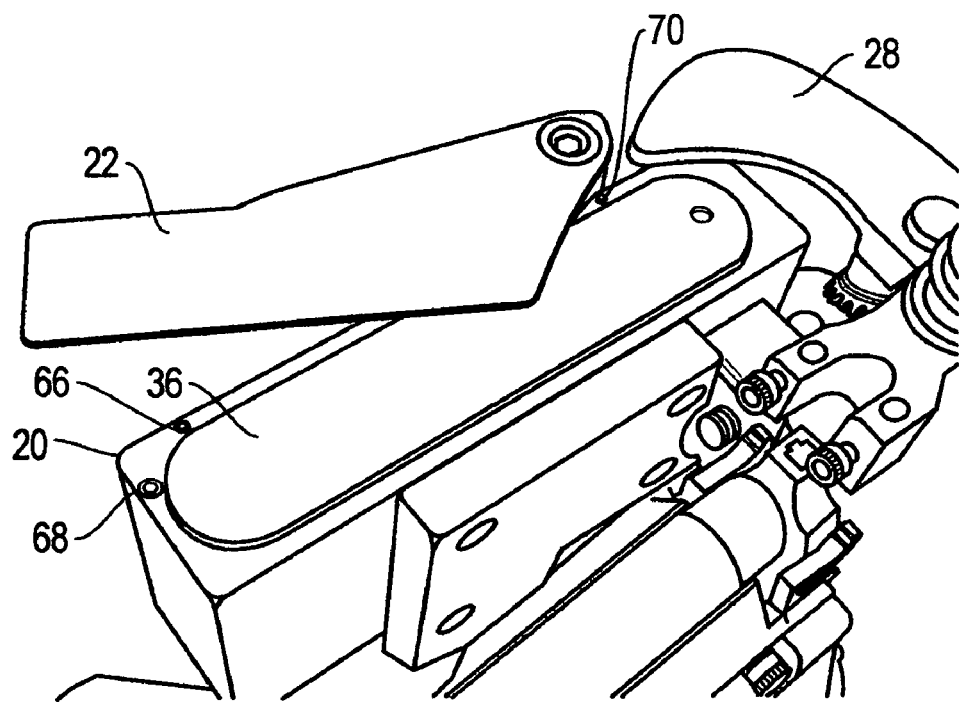
FIG. 19 is a bottom view of the tag magazine illustrating three tag constraints, two advance stopped pins and one reset stop pin.

Referring now to FIG. 19, a view of the tag storage mechanism of tag apparatus 10 is further disclosed. Here again, it is illustrated that keeper 22 may rotate out of position to accommodate the insertion of tags 36. Also illustrated are small constraints on the face of the magazine 20. There are two advance stop pins 66 and 68. Advance stop pins 66 and 68 are in place to ensure proper tag 36 rotation as lower arm 28 indexes a tag 36. During tag 36 rotation to final position, lower arm 28 imposes a force on one end of tag 36. In order to rotate the tag 36 properly, a reaction force must be imposed on the tag 36 at the other end. This is accomplished with the two small pins, advance stop pins 66 and 68 at the rear of tag magazine 20 that serve as a tag 36 constraint. A third pin, reset stop pin 70 toward the front of tag magazine 20 prevents the tag from moving as the lower arm 28 resets backs to its initial position.

Figure 20:
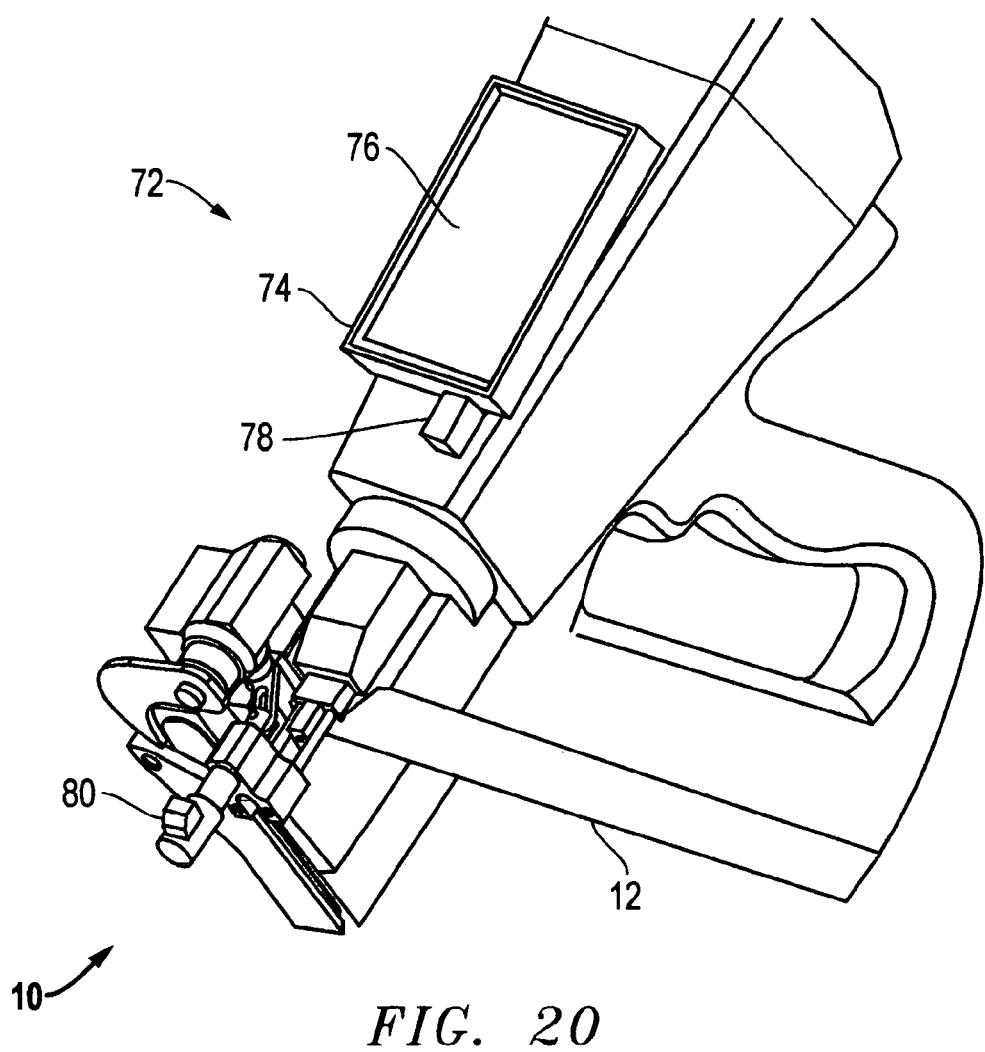
FIG. 20 is a top perspective view according to another embodiment of the invention wherein a scanner device is attached.
Figure 21:
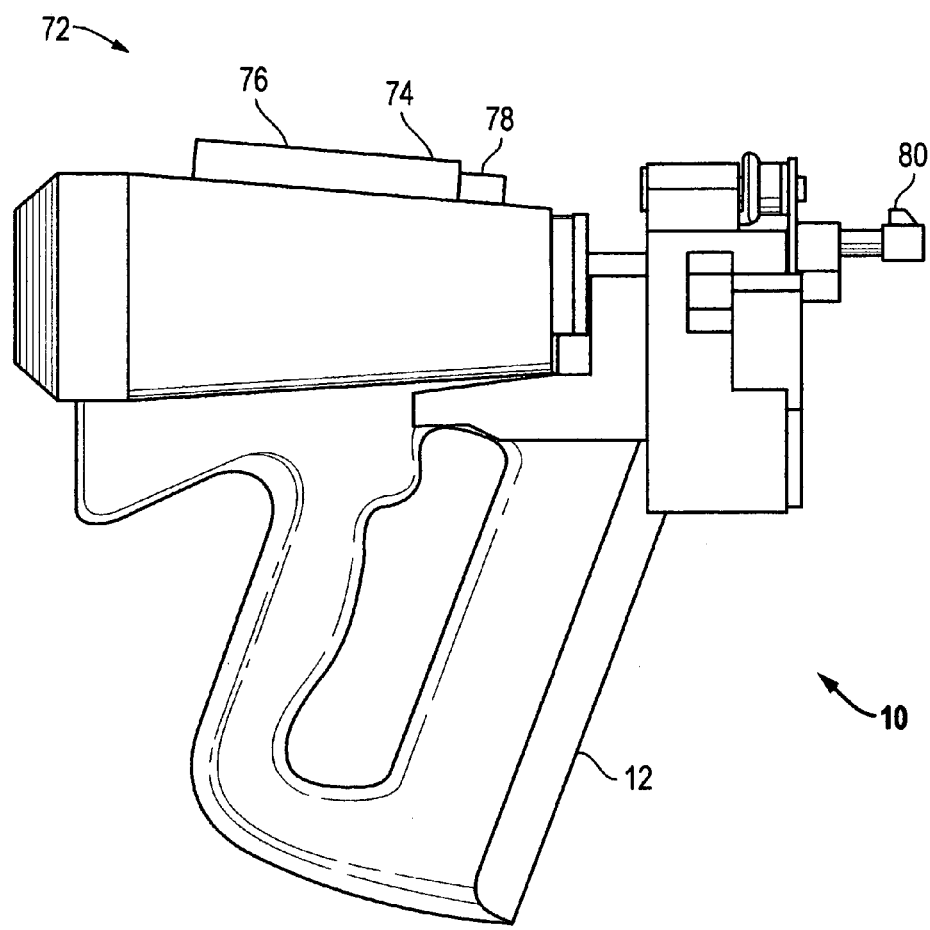
FIG. 21 is a side perspective view of the apparatus according to FIG. 20.

Referring now to FIGS. 20 and 21, another embodiment of the invention is provided. According to this embodiment, tag apparatus 10 further includes a scanner device 72. Scanner device 72 is held in position upon nail gun 12 by mount 74. Scanner device 72 includes a bar code logger 76, interface 78 and scanning head 80. Scanner device 72 may be any scanner device now known or hereafter developed. Many bar code scanners exist, some that are no larger than a credit card. In general, however, bar code logger 76 stores the bar code information received through interface 78 from scanning head 80. According to this embodiment, a user operates tag apparatus 10 as described above. In this embodiment, however, tags 36 include bar codes, or any desired format for presenting data, representing any desired information and/or data. After tag 36 is attached to a tree, again for example only, a user then scans across the bar code on the tag 36 which is hanging from the tree. This scanning motion takes place in a slight downward cant in the user's hand as indicated by the angle shown on the scanning head 80 in the figures. This angle facilitates reliable sensing without physical interference of the safety probe 18. This is important because the sensor scanning head 80 must come very close to the tag 36 for proper scanning. In addition, this angle prevents undue damage due to contact of the scanning head 80 during nail gun operation as probe 18 is repeatedly pressed against trees. Bar code logger 76 may be removed from tag apparatus 10 when full, or when desired, such that recorded bar code information may be downloaded and manipulated, all as known in the art.

Further, scanner device 72 may include a printer and a Global Positioning System (GPS), as are known in the art, such that information can be applied directly to the tag 36 prior to removal from tag apparatus 10 and reading by scanner device 72. In such a case, the exact location of every tagged tree, and including tree type, for example only, can easily be recorded.

In summary, tag apparatus 10 functions by converting translational motion, in and out motion, into rotational motion, side to side motion, in order to move the tag 36 from a stored position in tag magazine 20 to a final position. Energy for the translational motion is provided by the user pushing the nail gun 12 toward the tree, for example only, in a gross motion fashion. The output rotational motion provides the energy for rotating the tag 36 from the tag magazine 20 to a new orientation where the tag 36 may be affixed to the tree.

The description of the present embodiments of the invention have been presented for purposes of illustration but are not intended to be exhaustive or to limit the invention to the form disclosed. For example, nails may not be the appropriate attachment tool and the tags may be attached by staples, glue or any other means now known or hereafter developed. Thus, the invention may be used to attach "tags" to items other than trees, including shipping labels to boxes, for example only. Many modifications and variations will be apparent to those of ordinary skill in the art. As such, while the present invention has been disclosed in connection with the preferred embodiment thereof, it should be understood that there may be other embodiments which fall within the spirit and scope of the invention as set forth in the following claims

What is claimed is:

1. A tag apparatus comprising:
   a) a tag applying device;
   b) a tag magazine connected to said tag applying device;
   c) at least one tag stored within said tag magazine;
   d) a tag positioning device connected to said tag magazine and said tag applying device; and
   e) a probe device connected to said tag applying device such that translational movement of said probe device produces rotational movement of said tag positioning device and said at least one tag.

2. The apparatus of claim 1 further comprising a tag attachment device connected to said tag applying device conformed to attach said at least one tag to an object after said tag positioning device rotates said at least one tag.

3. The apparatus of claim 2 wherein said tag attachment device includes nails to attach said at least one tag to an object.

4. The apparatus of claim 1 further comprising a scanner device connected to said tag applying device conformed to scan said at least one tag and record data on said at least one tag.

5. The apparatus of claim 4 wherein said scanner device further includes a removable data recorder containing data recorded by said scanner device.

6. The apparatus of claim 4 wherein said data on said at least one tag includes bar codes.

7. The apparatus of claim 1 wherein said at least one tag is a flexible polymer tag.

8. A tag apparatus comprising:
   a) a nail gun including a nail magazine with nails;
   b) a tag magazine connected to the nail gun;
   c) more than one tag stored within the tag magazine;
   d) a tag positioning device connected to the tag magazine and the nail gun; and
   e) a safety probe connected to the nail gun such that translational movement of the safety probe produces rotational movement of the tag positioning device and one of the more than one tags stored in the tag magazine such that the one tag is in position to receive a nail from the nail magazine.

9. The apparatus of claim 8 further comprising a scanner device connected to the nail gun conformed to scan tags and record data on the tags.

10. The apparatus of claim 9 wherein the scanner device further includes a removable data recorder containing data recorded by the scanner device.

11. The apparatus of claim 9 wherein the data on the more than one tags includes bar codes.

12. The apparatus of claim 8 wherein the more than one tags are flexible polymer tags.

13. A tree tagging apparatus comprising:
   a) a nail gun including a nail magazine with nails;
   b) a tag magazine connected to the nail gun;
   c) a plurality of flexible tags stored within the tag magazine;
   d) a tag positioning device connected to the tag magazine and the nail gun;
   e) a safety probe connected to the nail gun such that translational movement of the safety probe produces rotational movement of the tag positioning device and one of the plurality of flexible tags stored in the tag magazine such that the one flexible tag is moved into position to be pierced by a nail from the nail magazine; and
   f) a scanner connected to the nail gun conformed to scan the flexible tags and record data on the flexible tags.

14. The apparatus of claim 13 wherein the scanner further includes a removable data recorder containing data recorded by the scanner.

15. The apparatus of claim 13 wherein the plurality of flexible tags are flexible polymer tags.

16. The apparatus of claim 13 wherein the data on the plurality of flexible tags includes bar codes.

17. A tagging method comprising:
   a) providing a nail gun including a nail magazine with nails;
   b) connecting a tag magazine to the nail gun;
   c) storing more than one flexible tag within the tag magazine;
   d) connecting a tag positioning device to the tag magazine and the nail gun;
   e) connecting a safety probe to the nail gun and pressing the safety probe against an object such that translational movement of the safety probe produces rotational movement of the tag positioning device and one of the more than one flexible tags stored in the tag magazine such that the one flexible tag is in position to receive a nail from the nail magazine; and
   f) actuating the nail gun such that a nail exits the nail gun, pierces the one flexible tag and pins the one flexible tag to the object.

18. The method of claim 17 further comprising connecting a scanner to the nail gun, scanning the one flexible tag after the one flexible tag is pinned to the object and recording scannable data on the one flexible tag.

19. The method of claim 18 wherein connecting the scanner further includes providing a removable data recorder containing data recorded by the scanner.

20. The method of claim 18 further comprising adding scannable data in bar code form on the more than one flexible tags.

* * * * *